United States Patent [19]

Bornstein

[11] 4,352,844
[45] Oct. 5, 1982

[54] THERMOPLASTIC FILM HAVING IMPROVED HANDLING AND SEALING CHARACTERISTICS AND RECEPTACLE FORMED THEREFROM

[75] Inventor: Norman D. Bornstein, Spartanburg, S.C.

[73] Assignee: W. R. Grace & Co., Duncan, S.C.

[21] Appl. No.: 268,207

[22] Filed: May 29, 1981

[51] Int. Cl.³ .................. B65D 65/40; B65D 75/06; B65D 75/12; B65D 85/50

[52] U.S. Cl. .................................... 428/35; 428/335; 428/516; 428/518; 428/520; 428/910; 264/176 R; 264/209.1; 206/524.2; 426/127; 229/87 F

[58] Field of Search ................ 428/35, 36, 520, 335, 428/518, 910, 516; 264/176 R, 209.1

[56] References Cited

U.S. PATENT DOCUMENTS 3,741,253 6/1973 Brax et al. ......................... 426/127
3,932,693 1/1976 Shaw et al. ........................ 428/518
4,178,401 11/1979 Weinberg et al. .................. 428/35
4,240,993 12/1980 Sun ..................................... 428/520
4,247,584 1/1981 Widiger et al. ..................... 428/520

FOREIGN PATENT DOCUMENTS 982923 2/1976 Canada ................................ 428/35

Primary Examiner—P. Ives
Attorney, Agent, or Firm—John J. Toney; William D. Lee, Jr.; Joe Harps

[57] ABSTRACT

Disclosed is a multi-layer, heat shrinkable, thermoplastic packaging film which will produce heat seals having improved strength both in the presence of and absence of grease at elevated temperatures, e.g., at shrink temperatures. The layer providing the sealing surface comprises an ethylene-vinyl acetate copolymer which is more crystalline and about half the thickness of the adjacent layer of less crystalline ethylene-vinyl acetate copolymer. Bags for food products can be made from the film at a faster rate than with prior art films.

12 Claims, No Drawings

THERMOPLASTIC FILM HAVING IMPROVED HANDLING AND SEALING CHARACTERISTICS AND RECEPTACLE FORMED THEREFROM

FIELD OF INVENTION

This invention relates generally to improvements in heat-shrinkable thermoplastic packaging film which can be heat sealed to itself to form a bag, pouch, or other receptacle. Specifically, the invention relates to improvements in the seal strength at elevated temperatures both in the presence and absence of grease and in the processability of film having otherwise tacky surfaces.

BACKGROUND OF THE INVENTION

A heat shrinkable, thermoplastic, multi-layer packaging film which has enjoyed considerable commercial success is described in U.S. Pat. No. 3,741,253 which issued on June 26, 1973 to H. J. Brax et al. A film disclosed in the Brax et al patent may be produced by extruding a first or substrate layer of ethylene-vinyl acetate copolymer as an unstretched tube and then flattening the tube and moving it in a series of passes through an electron beam to cross-link the molecules of the copolymer. Next, the film is inflated but not substantially stretched and passed through an annular coating die where it receives a second layer which is a copolymer of vinylidene chloride. The two layer tube then passes through another annular die in which it receives a coating of ethylene-vinyl acetate copolymer. The tube now has a wall of three polymeric layers and is cooled, collapsed, and fed through a hot water bath where the tube is sufficiently softened so that it can be inflated into a bubble which is trapped between two spaced apart pairs of pinch rollers. The inflation causes the tubing to be stretched into oriented film as the bubble cools quickly as it leaves the hot water bath. After the bubble is collapsed the film is wound up as flattened, seamless, tubular film to be later used to make bags, e.g. end-seal bags are typically made by transversely heat sealing across the width of the tubing followed by severing the tubing. Thus, the transverse seal will form the bottom of a bag.

In making bags as described above in a rapid commercial operation by pressing the flattened sheet walls together with heated seal bars, the dwell time of the seal bars should be as short as possible yet sufficiently long to fuse and bond the inside surface layer of the tube to itself in a smooth, continuous, strong seal. The importance of a strong reliable seal is readily understood when the use and function of the bag is described. This type of bag is primarily used to package a large variety of fresh and processed meats, cheese, and fish by placing the meat in the bag, evacuating the bag, gathering and applying a metal clip through the mouth of the bag to hermetically seal it, and then immersing the bag in a hot water bath at approximately the same temperature at which the film was stretch-oriented. This temperature will typically run from 160° to 200° F. One problem which has been encountered is the failure of the bag seals at the bottom of the bag as the bag is shrunk around the meat and the shrink forces tend to pull the seal apart. It was observed that an inflated bag immersed in hot water would have a more reliable seal than a bag filled with meat even though the unfilled bag had been inflated to a pressure which would duplicate the same forces on the seal. It appears that animal fat, particularly fat from processed meats, dissolves in the ethylene-vinyl acetate copolymer layer in the seal area, tends to act like a plasticizer, and softens and weakens the seal. One way to solve this problem was to increase the dwell time of the seal bars to make a stronger seal and also to use wider seals. However, this would reduce the production speed of bags and waste bag material. Accordingly, it is one object of the present invention to provide an improved film from which bags can be made and which will not rupture or pull apart at elevated temperatures.

Another problem encountered in handling and processing bags of a thermoplastic material having a low melting point is that of tackiness, i.e., the tendency of the bag material to stick to itself. Thus, it is another object of the present invention to make a multi-layer laminate where the layer having the greatest degree of tackiness is an interior layer rather than a surface or skin layer.

Still another object of the present invention is to improve seal reliability when using low melting temperature resins in a multi-layer film.

In the film of the Brax et al patent the vinylidene chloride comprises the middle layer. This layer is important because the vinylidene chloride copolymer has very low gas transmission whereas, by comparison, the ethylene-vinyl acetate copolymers which provide the shrink and sealing layers do not. Thus, another object of the present invention is to provide shrink and gas transmission properties at least approximately equal to the prior art film and at the same time have improved sealing and processing characteristics.

The foregoing objects are achieved by the present invention which is summarized in the paragraphs below.

SUMMARY OF INVENTION

It has been surprisingly discovered that the problems of prior art films set forth above can be solved and the desirable shrink properties retained by the film and process of this invention. In other words, objects of the invention are achieved by a multi-layer, heat shrinkable film which comprises at least two layers, the first layer being a surface layer and the second layer being adjacent thereto; said first and second layers comprising ethylene-vinyl acetate copolymers, the copolymer of the first layer having a higher melting temperature or being more crystalline than the copolymer of the second layer; said second layer being at least 1½ times the thickness of the first layer; the copolymers in both layers being cross-linked; and, each layer being stretch oriented. These two layers form the substrate to which other layers can be added. In one preferred embodiment wherein the object is to provide resistance to attack by grease at shrink temperatures, the film has third and fourth layers added to it wherein the third layer comprises a thermoplastic material having low gas permeability such as vinylidene chloride copolymer or hydrolyzed ethylene-vinyl acetate copolymer and the fourth layer comprises an ethylene-vinyl acetate copolymer.

In another aspect, the present invention is a method of improving the handling characteristics of a lower melting ethylene-vinyl acetate copolymer film and improving its heat sealing properties at shrink temperatures by joining a higher melting ethylene-vinyl acetate copolymer film to the surface of the lower melting point layer whereby the higher melting copolymer becomes a surface layer and the lower melting copolymer layer is of greater thickness than the higher melting layer.

It is also preferred that the film be in the form of a seamless tube which can be flattened, transversely sealed, and severed to form a bag. In still another aspect of the invention, the film can be formed into a casing.

PREFERRED EMBODIMENT

In order to find a film structure which gives the best seal making rate wherein the seals would retain their integrity at elevated temperatures in the presence of fats and greases a number of film structures were tested. First, three ply structures were tested using various ethylene-vinyl acetate copolymer resins for the outer layers but no structure could be found which gave a satisfactory combination of seal making rate, shrink properties, seal strength at shrink temperature, and grease resistance. Four ply structures were then considered and the addition of another layer to the sealing surface was investigated. It was surprisingly discovered that an ethylene-vinyl acetate copolymer having a higher crystallinity than the heretofore used surface sealing layer would provide grease resistance at the higher seal making rates yet the entire structure would retain desired shrink properties of the prior art materials, i.e., the second layer controls the shrink properties of the multi-layer film.

The test used to determine seal integrity at elevated temperatures is one in which a thin coat of grease is applied to the surfaces to be sealed when the bag is made and then, after the bag is made, it is inflated to a control pressure, then immersed in hot water, and held at a temperature of 180° to 185° F. The heat from the hot water will cause the bag material to tend to shrink thus increasing the forces on the seal area. For the static test the bag is then held without further inflation for a fixed period of time. At the end of the time period if the bag is still in-tact pressure is increased slowly until rupture occurs. The rupture pressure is then recorded as the measure of the bag's seal strength. Fat from processed meat is used to provide the grease medium which attacks seals.

As described above, the seals which are referred to are used to form receptacles such as bags. These bags fall into two categories, one being called end seal bags and the other being called side seal bags. The end seal bags are made as previously described, i.e., flattened tubing is transversely sealed and severed so that the transverse seal forms the bottom of one bag and the tubing which is severed immediately behind the seal will provide the mouth of the next succeeding bag. In the case of the side seal bags tubing is also flattened and two spaced apart parallel transverse seals are made across the flattened tubing with the distance between the parallel seals being the width of the bag. One side edge of the tubing is trimmed off to provide a mouth for the bags and the bags can be removed from the tubing by severing the tubing.

In one preferred embodiment, the multi-film of the invention is made by a process similar to that described for the Brax et al patent above except that the substrate is coextruded in two layers rather than as a single layer. In other words, in the first step of making the preferred film two extruders feed a single annular coextrusion die where the inner or first layer is ethylene-vinyl acetate copolymer having approximately 6.2% vinyl acetate content and a melt flow of about 2.0. The outer layer or second layer is also ethylene-vinyl acetate copolymer but this time it has 9% vinyl acetate content and a melt flow of approximately 2.0. The second layer is preferably about twice as thick as the first layer and will be about 9.5 mils thick whereas the first layer will be about 5.0 mils thick. This coextruded tube has a diameter of about 4½ inches. After cooling it is flattened and guided through a shielded irradiation vault where it passes under the beam of an electron accelerator to receive a dosage of approximately 5 megarads. Irradiation by electrons to cross-link the molecules in the polymeric materials is well known in the art.

At this point, the tubing could be run through a hot water bath and inflated by the trapped bubble technique to make a two layer film having good grease resistance at elevated temperatures. But, since a film having low gas transmission is desired, a gas impermeable layer is applied by inflating the tubing but not stretching it and then passing it through a coating die where the tubing receives a coating of a copolymer of vinylidene chloride and vinyl chloride. The preferred copolymer is a lightly plasticized copolymer of vinylidene chloride and vinyl chloride being a mixture of 10% suspension polymerized and 90% emulsion polymerized copolymer. The emulsion polymerized copolymer consists of about 70% vinylidene chloride and 30% vinyl chloride and the suspension polymerized copolymer consists of about 80% vinylidene chloride and 20% vinyl chloride. In the preferred embodiment, the thickness of this vinylidene chloride copolymer layer is 3.5 mils to 4.0 mils.

After receiving the vinylidene chloride copolymer layer the coated tubing is fed through another coating die where it receives a final layer of 6.0 mils of ethylene-vinyl acetate copolymer having 6.2% vinyl acetate content which is the same basic copolymer which makes up the first or inside layer. Of course, this layer has not been irradiated.

After the final layer has been applied, film is then again cooled and collapsed after which it is fed into a hot water tank having water at about 190° F. where it passes through pinch rolls and is then inflated and stretched to a point where the thickness is approximately 2 mils. This will be the final thickness of the multi-layer film of the preferred embodiment. As the bubble emerges from the hot water tank it cools rapidly in air and then is collapsed and rolled up into flattened tubing. It is from this tubing that bags can be made as described above.

From the flattened tubing bags can be made at a rate of up to 120 bags per minute for side seal bags whereas prior art bags could be satisfactorily made at only 60 to 65 bags per minute. Thus, seal bar dwell time and cooling time between sealing and severing is significantly reduced.

The resins or basic polymeric materials fed into the extruders to make the film of the present invention can be purchased from any of a number of suppliers and these can be found by consulting trade publications such as *Modern Plastics Encyclopedia*, 1980–1981 on pages 815–826 under the heading "Resins and Molding Compounds." It is preferred that the bags be made from a film grade ethylene-vinyl acetate copolymer.

It has been discovered that the first layer should contain the ethylene-vinyl acetate copolymer which is more crystalline, i.e., it generally has less vinyl acetate content and less chain branching in its molecular structure. The amount of vinyl acetate in any one layer is not absolute, only relative to the other layer. For example, when a film having moderate shrink tension is desired for packaging a product like block cheese the first layer should have a vinyl acetate content of about 15% and the second layer should have about 18%. For a product such as fish the first layer will have about 12% vinyl acetate content and the second layer will have about 18% vinyl acetate content by weight. Thus, for these food packaging applications, the first layer vinyl acetate content can range from 10% to 16% and the second layer from 17 to 20%. It has also been found that the second layer should be approximately twice the thickness, at least 1½ times the thickness of the first layer, in order to control the shrinkage of the final film. Because the first layer is less crystalline it tends to melt at a higher temperature than the second. Hence, the second layer can be oriented at a lower temperature so that it will likewise shrink at a lower temperature. Thus, when being placed in a hot water bath the second layer will begin to shrink first as the film is heated and because the second layer is thicker it will control the shrinkage of the entire multi-layer film. The more crystalline and higher melting range first layer is needed for its seal strength but its higher shrink temperatures is not desired and is overcome by the second layer. Thus, the invention achieves the desired shrink features and seal strength.

Another receptacle which can be made from the film of this invention is a casing which is formed by joining the opposed edges of a sheet of film by heat sealing the edges together to form a tube and then closing one end of the tube by gathering the tube material and applying either a metal or plastic clip to hold the gathered material in a hermetic closure. The application of such clips is well known in the art.

Having thus described my invention, I claim:

1. A multi-layer, heat shrinkable, thermoplastic packaging film which will produce heat seals having improved seal strength and grease resistance at shrink temperatures comprising:
   (a) at least three layers, the first layer being a surface layer and the second layer being adjacent thereto;
   (b) said first and second layers comprising ethylene-vinyl acetate copolymers, the copolymer of the first layer having a higher melting temperature than the copolymer of the second layer;
   (c) said second layer being at least 1½ times the thickness of the first layer; whereby the shrink temperature of the entire multi-layer film is controlled by the shrink temperature of the second layer;
   (d) the copolymers in both first and second layers being cross linked: and,
   (e) at least one additional or third polymeric layer adjacent the second layer, the material of said additional layer comprising a copolymer selected from the group consisting of vinylidene chloride copolymers and hyrolyzed ethylene-acetate copolymers.

2. The film of claim 1 wherein said first and second layers are melt joined with no adhesive therebetween.

3. The film of claim 1 wherein the copolymer in the first layer has 5.0% to 7.5% vinyl acetate content by weight and the copolymer in the second layer has 8.5% to 12.0% vinyl acetate content.

4. The film of claim 1 wherein the copolymer of the first layer has 10% to 16% vinyl acetate content and the second layer has 15% to 20% vinyl acetate content.

5. The film of claim 1 including:
   (i) a third layer comprising a thermoplastic material having low gas permeability, said third layer being joined to said second layer; and,
   (ii) a fourth layer joined to the third layer, said fourth layer comprising an ethylene-vinyl acetate copolymer.

6. The film of claim 5 wherein the total thickness of all four layers is approximately 2 mils; the second layer is approximately twice the thickness of the first; and, the first and second layers have been cross-linked to a degree equivalent to a dosage level of approximately 5 MR.

7. A seamless tube constructed of film according to claim 5 wherein said first and second layers were formed by annular coextrusion and said third and fourth layers were extrusion coated thereon, said first layer providing the inside surface of said tube.

8. A receptacle comprising the tube of claim 7 and having a transverse heat seal across the width of the tube.

9. A receptacle comprising a sheet of the film of claim 5 wherein opposed edges of the sheet are heat sealed together to form a tube and one end of said tube is closed by a clip to form a casing.

10. A method of improving the handling and heat sealing characteristics at shrink temperatures of a heat shrinkable film having a surface or second layer comprising an ethylene-vinyl acetate copolymer, said method comprising the steps of:
    (a) providing an ethylene-vinyl acetate copolymer for a first layer, the copolymer for the first layer having a higher melting temperature than the copolymer of the second layer; and,
    (b) forming a joining said first layer to a surface of said second layer whereby said first layer becomes a surface layer for the resulting multi-layer film, said second layer being at least 1½ times thicker than the first, whereby the heat shrink temperature of the resulting multi-layer film is controlled by the heat shrink temperature of said second layer.

11. The method of claim 10 wherein step (b) is performed by coextruding said first and second layers.

12. The method of claim 10 including after step (b) the steps of cross-linking said first and second layers by irradiating them with ionizing radiation and adding an additional polymeric layer adjacent the second layer, the material of the adjacent layer comprising a copolymer selected from the group consisting of vinylidene chloride copolymers and hydrolyzed ethylene-vinyl acetate copolymers.

* * * * *